United States Patent [19]

Cienfuegos

[11] 4,150,851
[45] Apr. 24, 1979

[54] SEAT FOR BICYCLES AND THE LIKE

[76] Inventor: Henry Cienfuegos, 154 S. 8th. St., La Puente, Calif. 91746

[21] Appl. No.: 831,257

[22] Filed: Sep. 7, 1977

[51] Int. Cl.² .................................................. B62J 1/00
[52] U.S. Cl. .................................... 297/195; 248/408; 403/109
[58] Field of Search ............... 297/195; 248/161, 406, 248/407, 408, 409; 403/109

[56] References Cited

U.S. PATENT DOCUMENTS

| 510,993 | 12/1893 | Riess | 297/195 |
|---|---|---|---|
| 2,415,479 | 2/1947 | Forney | 403/109 X |
| 2,644,504 | 7/1953 | Vick | 403/109 X |
| 3,350,120 | 10/1967 | Hinrichs | 403/109 |

FOREIGN PATENT DOCUMENTS

| 53494 | 1/1936 | Denmark | 248/407 |
| 21497 of | 1894 | United Kingdom | 248/408 |
| 617928 | 2/1961 | Italy | 248/408 |

Primary Examiner—Roy D. Frazier
Assistant Examiner—Peter A. Aschenbrenner
Attorney, Agent, or Firm—Julius Louis Rubinstein

[57] ABSTRACT

A hollow seat post has a seat attached at one end while the opposite end is split defining an aligning pin receiving groove. One portion of the split end is provided with longitudinally spaced pin receiving holes. A coil spring is inserted inside a frame seat post. A small pin extending through the bottom of the frame seat post serves as a stop for the coil spring. A second pin extends through the upper portion of the frame seat post and aligns the seat when the seat post is inserted inside the frame seat post with the second pin in the groove in the seat post. A lever actuated pin is mounted on the frame and is positioned so the pin is in alignment with a hole extending through the frame seat post and can move therein. When the seat post is inserted in the frame seat post and the hole in the frame seat post is aligned with one of the holes in the seat post, the lever actuated pin penetrating both holes holds the seat at the desired level.

7 Claims, 5 Drawing Figures

U.S. Patent  Apr. 24, 1979  4,150,851
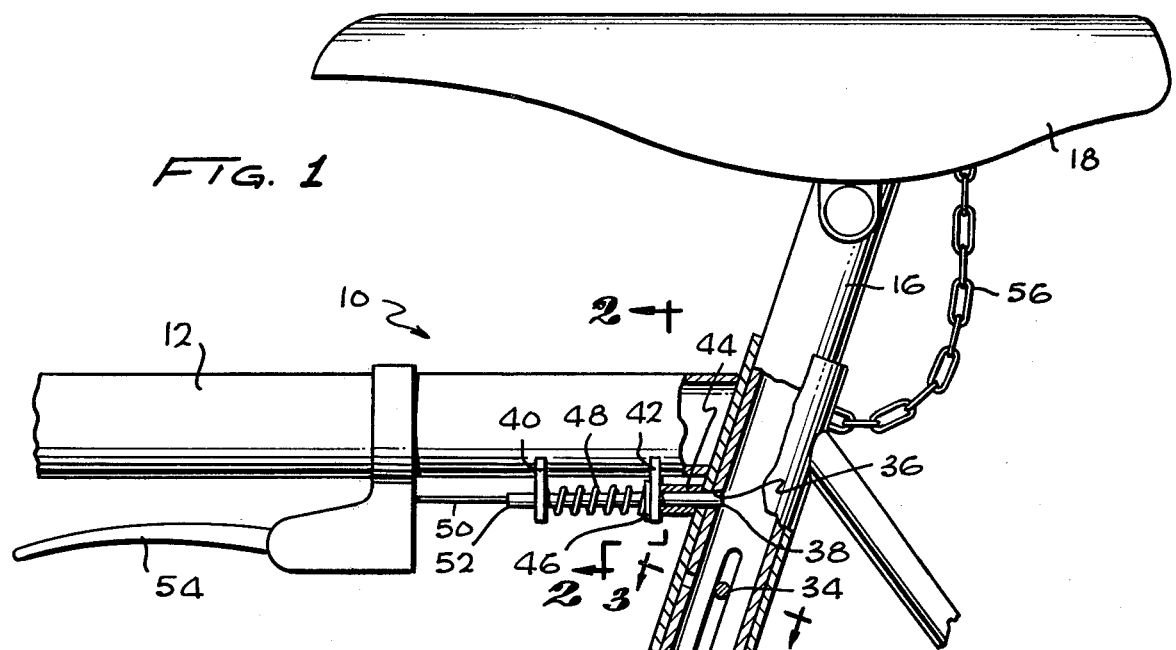
FIG. 1
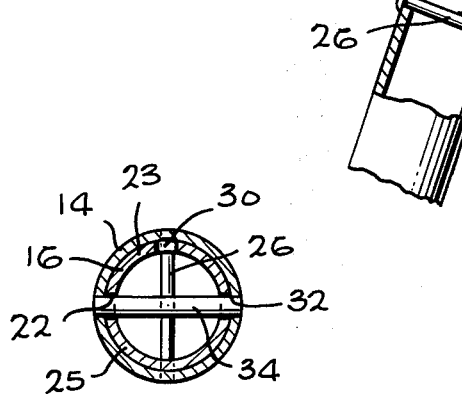
FIG. 2
FIG. 3
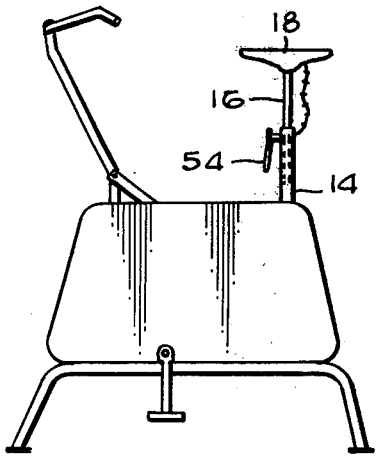
FIG. 4
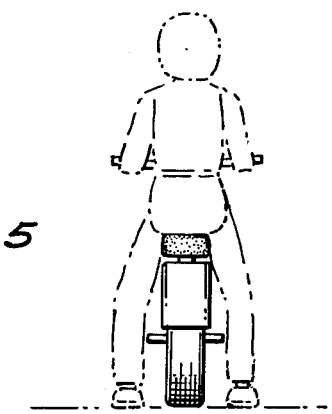
FIG. 5

SEAT FOR BICYCLES AND THE LIKE

This invention relates to a seat, and, more particularly, to an adjustable seat for bicycles, motorcycles, and stationary pedal actuated cycle-type exercise machines.

BACKGROUND AND BRIEF SUMMARY

Heretofore, many efforts have been made to adjust the height of bicycle seats, preferably while the rider is on the seat. However, those previously made were not successful for economic reasons. This is because bicycles are in general comparatively low cost items, and any design for making the seats easily adjustable, which is not economical to make and install, is too impractical for use. The real problem is to find a design which fits the rigid parameters imposed by the marketplace. Any solution to this design problem which does not take economics into account is really no solution at all because it would never be used.

The present adjustable seat fits the above-described design criteria because the number of parts required to make the seat adjustable have been reduced, and the parts that are required are to a large extent off-the-shelf items requiring little modification to make them suitable for their purpose.

In particular, a hollow seat post has a seat at one end while the opposite end is split to define an aligning pin receiving groove. One portion of the split opposite end has longitudinally spaced pin receiving holes. The hollow seat post is insertable inside a hollow frame seat post and the seat post is just large enough for an easy sliding fit inside the frame seat post. A coil spring is inserted the frame seat post below the seat post. A first pin extends through the bottom of the frame seat post and serves as a stop for the spring. A second pin extending through the upper end of the frame seat post aligns the seat with respect to the frame when the seat post is inserted inside the frame seat post with the second pin in the pin receiving groove. A lever actuated spring biased locking pin mounted on the frame in the pin is aligned with a hole extending through the frame seat post and is movable therein. When the seat post is inserted inside the frame seat post and the hole in the frame seat post is aligned with one of the holes in the seat post, the locking pin can move through both holes to hold the seat at the desired level.

One of the objects of this invention is to provide a simple economical-to-make adjustable seat for use on bicycles, motorcycles, exercycles, and the like.

A further object of this invention is to provide a seat which can be adjusted with respect to height while the machine is being used.

Other objects and advantages will become more apparent when better understood in the light of the accompanying specification and drawings wherein:

FIG. 1 is an elevational view partly in section showing the adjustable seat mounted on a cycle frame.

FIG. 2 is a sectional view taken on the line 2—2 of FIG. 1.

FIG. 3 is a sectional view taken on the line 3—3 of FIG. 1.

FIG. 4 is an elevational view showing the adjustable seat mounted on an exercycle.

FIG. 5 is an elevational view showing the adjustable seat mounted on a motorcycle.

Referring now to FIG. 1 of the drawing, the frame of a bicycle indicated generally by the reference number 10 includes a horizontal support bar 12 and a generally vertical hollow frame seat post 14. A seat post 16 has a seat 18 attached at one end. The opposite end 20 of the seat post 16 is split defining an aligning pin receiving groove 22 between tines 23 and 25.

A first coil spring 24 is inserted inside the frame seat post 14 for reasons to be described below. Depending on the design of the frame seat post 14, a stop may or may not be required against which one end of the coil spring may rest. If the bottom of the seat post is shaped so it cannot serve as a stop, a simple pin 26 is inserted diametrically through the bottom of the frame seat post for supporting the lower end of the coil spring 24. When the seat post 16 is inserted inside the frame seat post 14, the coil spring 24 is compressed between the lower end 28 of the seat post 16 and the pin 26.

The frame seat post 14 is provided with a hole 32 extending therethrough. See FIG. 3. A simple pin 34 extends through the hole and is locked to the frame seat post 14 by any suitable means. The diameter of the pin 34 is slightly less than the width of the groove 22 in the seat post 16, and the pin 34 and the groove 22 are so disposed with respect to each other that when the seat post 16 is inserted inside the frame seat post 14, with the pin 34 in groove 22, the seat 18 will be aligned correctly with respect to the frame 10.

Tine 23 of the seat post 16 is provided with longitudinally spaced height adjusting holes 30. In addition, the frame seat post 14 is provided with a locking pin receiving hole 36, which is the same size as hole 30. A spring actuated locking pin 38 is mounted on the frame for penetrating holes 30 and 36. To do this, the horizontal frame member 12 is, in this particular embodiment, provided with downwardly extending support member 40 and a combined support and guide member 42. Members 40 and 42 have aligned openings extending therethrough through which the pin 38 extends. These aligned openings maintain pin 38 in spaced parallel relationship to frame member 12. Support member 42 is provided with an integrally attached aligning tube 44 which is attached to frame seat post 14 over opening 36. Pin 38 is long enough to extend through the support members 40 and 42 and through the aligning tube 44 and so it can penetrate holes 36 and 30. In this way, pin 38 will always be in alignment with hole 36. A stop member 46 is secured to pin 38, and a second coil spring 48 is mounted over pin 38 between stop member 46 and support 40. The effect of spring 48 is to bias pin 38 in a direction through the aligning tube 44 and through holes 36 and 30.

One end of a cable, which may be the same type of cable used on bicycle brakes, is secured by any suitable means to the end 52 of pin 38. An operating handle 54 like that used on bicycle brakes is secured by any suitable means to frame 10. The opposite end of cable 50 is secured to the operating handle in such a way that when the operating handle 54 is squeezed against the frame member 12, the cable 50 pulls pin 38 against the bias of the coil spring and moves the pin 38 out of holes 30 and 36. When the operating handle is released, the coil spring 48 again biases the pin 38 towards hole 36.

A chain 56 is secured between seat 18 and frame seat post 14 to prevent this seat from flying violently away from the frame in the event the operating handle 54 is inadvertently squeezed while no one is on the seat.

The embodiment shown in FIG. 4 shows the teachings of this device used in connection with a pedal actuated stationary exercising cycle of the type commonly used in gymnasiums and which are known as exercycles. The exercycle in a gymnasium is used by large numbers of different people during the course of the day, and the adjustable seat provides a simple way to conveniently vary the seat height in accordance with the requirements of the various users. As shown in FIG. 4, the lever member 54 is mounted on the vertically disposed frame seat post 14. The locking pin 38 and coil spring 48 (not shown) are mounted in a support member and aligning tube which is secured by any suitable means to the frame seat post 14. A cable like that shown in FIG. 1 is connected at one end of the locking pin and at the other end to lever member 54. When the lever member 54 is pressed against the frame seat post, the cable pulls the locking pin against the biasing force exerted by coil spring 48 out of the hole in the frame seat post to permit the height of the seat 18 to be adjusted.

FIG. 5 shows the adjustable seat used in connection with a heavy motorcycle. In this embodiment, the adjustable seat permits the motorcycle to be stopped with the operator's legs resting on the ground while the frame of the motorcycle is in an erect position. In this way, no substantial weight has to be supported by the rider, whereas if the motorcycle had to be supported in a leaning position, substantial effort would be required.

In use, a person mounting the bicycle or exercycle sits on the seat. Then, by pressing the feet against the pedals, he can lift his weight off the seat, and by squeezing or pressing the spring operating handle 54 against the frame member 12, or frame seat part 14 as in FIG. 4, he withdraws pin 38 from holes 36 and 30. This permits the coil spring 24 to lift the seat upwardly against the person's body to the desired height. Then, by releasing the operating handle 54 and varying the weight on the seat, the seat can be moved up and down slightly until holes 30 and 36 are in alignment permitting the spring biased pin 38 to move into holes 30 and 36 locking the seat in the correct height.

It is noted that when the device is used on a bicycle, the seat height can be adjusted while the bicycle is in motion. This is useful because the best seat height for riding a bicycle is not always the best seat height for getting off while the bicycle is stopping. With this arrangement, as the bicycle is being stopped, the operating handle 54 is squeezed causing the weight of the rider to move seat 18 to its lowest point. When this happens, the feet of the rider can touch the ground while the bicycle is in an erect position.

On the other hand, after getting on the bicycle and while the bicycle is moving, the seat can be raised by squeezing the operating handle and raising the weight off the seat until the seat moves up to the proper height. As stated above, this arrangement is very helpful when the bicycle is being used by small children, who are otherwise unable to bear the weight of the bicycle if they have to get off the bicycle when the bicycle is in a leaning position.

Having shown and described the invention, what I claim is new is:

1. An apparatus of the class described comprising a frame, said frame comprising a generally vertically disposed frame seat post and an intersecting generally horizontally disposed frame bar, a seat post having opposed ends, one end of said seat post adapted to have a seat secured thereto, the opposite end of said seat post split defining spaced parallel tines, the separation between said tines defining an aligning groove, said opposite end of said seat post movably positioned in said frame seat post, a first pin extending through the lower end of said frame seat post, a first coil spring in said frame seat post disposed between said first pin and said opposite end of said frame seat post, a second pin extending through the upper part of said frame seat post and passing through said aligning groove to align the seat on said frame, one of said tines having longitudinally spaced locking pin receiving holes formed therein, the upper part of said frame seat post having a locking pin hole formed therein, first and second bearing members mounted on said generally horizontally disposed frame bar, a generally horizontally disposed locking pin movably mounted on said first and second bearing members and in closely spaced relation to said horizontally disposed frame bar and sized to penetrate said hole in said frame seat post, a second coil spring mounted on said locking pin, a stop member rigidly mounted on said locking pin, said second coil spring disposed between said stop member and said first bearing member whereby said locking pin is biased toward said hole in said frame seat post, said second bearing member having elongated guide means formed thereon, said guide means cylindrical in shape and long in comparison to its thickness and in closely spaced relation to the intersection of said frame seat post and said horizontally disposed frame bar and covering said hole in said frame seat post, one end of said locking pin movably mounted in said guide portion of said second bearing member, and manually operable means extending closely adjacent the horizontal bar and connected to said locking pin for retracting said locking pin away from said hole in said frame seat post when the seat is to be adjusted.

2. An apparatus of the class described comprising a frame, said frame comprising a generally vertically disposed frame seat post and a generally horizontally disposed frame bar, a seat post having opposed ends, one end of said seat post adapted to have a seat secured thereto, the opposite end of said seat post split defining spaced parallel tines, the separation between said tines defining an aligning groove, said opposite end of said seat post movably positioned in said frame seat post, a first pin extending through the lower end of said frame seat post, a first coil spring in said frame seat post disposed between said first pin and said opposite end of said frame seat post, a second pin extending through the upper part of said frame seat post, and passing through said aligning groove to align the seat on said frame, one of said tines having longitudinally spaced locking pin receiving holes formed therein, the upper part of said frame seat post having a locking pin hole formed therein, first and second bearing members mounted on said generally horizontally disposed frame bar, a generally horizontally disposed locking pin movably mounted on said first and second bearing members and in spaced relation to said horizontally disposed frame bar and sized to penetrate said hole in said frame seat post and the holes in said tine of said seat post, a second coil spring mounted on said locking pin, a stop member rigidly mounted on said locking pin, said second coil spring disposed between said locking member and said first bearing member whereby said locking pin is biased toward said hole in said frame seat post, said second bearing member having guide means formed thereon, said guide means in closely spaced relation to said generally vertically disposed frame seat post and covering said hole in said frame seat post, one end of said locking pin movably mounted in said guide portion of said second bearing member, and manually operable means extending closely connected to said locking pin for retracting said locking pin away from said hole in said frame seat post when the seat is to be adjusted, said manually operable means including a cable, one end of said cable secured to the end of said locking pin remote from said one end, a lever member pivotally mounted on said generally horizontally disposed frame bar, the opposite end of said cable attached to said lever member whereby when the lever member is forced against the generally horizontally disposed frame bar, the cable pulls said locking pin against the biasing force exerted by said second coil spring to retract said locking pin away from the hole in the frame seat post to permit the height of the seat to be adjusted.

3. The apparatus set forth in claim 1 wherein said manually operable means includes a cable, one end of said cable secured to the end of said locking pin remote from said one end, and an actuating device mounted on said frame, the opposite end of cable attached to said actuating device whereby when the actuating device is actuated, the cable is pulled which pulls said locking pin against said biasing force exerted by said second coil spring to retract said locking pin away from the hole in the frame seat post to permit the height of the seat to be adjusted.

4. An apparatus of the class described comprising a frame, said frame comprising a generally vertically disposed frame seat post, a seat post having opposed ends, one end of said post adapted to have the seat secured thereto, the opposite end of said seat post split defining spaced parallel tines, the separation between said tines defining an aligning groove, said opposite end of said seat post movably positioned in said frame seat post, a first pin extending through the lower end of said frame seat post, a first coil spring in said frame seat post disposed between said first pin and the opposite end of said seat post, a second pin extending through the upper part of said frame seat post and passing through said aligning groove to align the seat on said frame, one of said tines having longitudinally spaced locking pin receiving holes formed therein, the upper part of said frame seat post having a locking pin hole formed therein, first and second bearing members mounted on said frame, a locking pin movably mounted on said first and second bearing members and sized to penetrate said hole in said frame seat post and the holes in said tine of said seat post, a stop member rigidly mounted on said locking pin, a second coil spring mounted on said locking pin, said second coil spring disposed between said stop member and said first bearing member in such a way that said locking pin is biased towards said hole in said frame seat post, said second bearing member having guide means formed thereon, said guide means in closely spaced relation to said generally vertically disposed frame seat post and covering said hole in said frame seat post, one end of said locking pin movably mounted in said guide means, a cable, one end of said cable secured to the end of said locking pin remote from said one end, a lever pivotably mounted on said frame, the opposite end of said cable attached to said lever in such a way that when the lever is actuated the cable pulls the locking pin against the biasing force exerted by said second coil spring to retract said locking pin away from the hole in said frame seat post to permit the height of the seat to be adjusted.

5. The apparatus described in claim 4 wherein said frame is part of an exercycle.

6. The apparatus described in claim 5 wherein said combined first and second bearing members, said locking pin and said lever are mounted on the frame seat post.

7. An apparatus of class described comprising a frame, said frame comprising a generally vertically disposed frame seat post, a seat post having opposed ends, one end of said post adapted to have a seat secured thereto, the opposite end of said seat post split defining spaced parallel tines, the separation between said seat post movably positioned in said frame seat post, a first pin extending through the lower end of said frame seat post, a first coil spring in said frame seat post disposed between said first pin and the opposite end of said seat post, a second pin extending through the upper part of said frame seat post and passing through said aligning groove to align the seat on said frame, one end of said tines having longitudinally spaced locking pin receiving holes formed therein, the upper part of said frame seat post having a locking pin hole formed therein, first and second bearing members mounted on said frame a locking pin movably mounted on said first and second bearing members and sized to pentrate said hole in said frame seat post and the holes in said tines of said seat post, a second coil spring mounted on said locking pin, a stop member rigidly mounted on said locking pin, said second coil spring disposed between said stop member and said first bearing member in such a way that said locking pin is biased toward said hole in said frame seat post, said second bearing member having guide means formed thereon, said guide means in closely spaced relation to said generally vertically disposed frame seat post and covering said hole in said frame seat post, one end of said locking pin removably mounted in said guide means, a cable, one end of said cable secured to the end of said locking pin remote from said one end, an actuator mounted on said frame, the opposite end of said cable attached to said actuator in such a way that when the actuator is actuated the cable pulls the locking pin against the biasing force exerted by said second coil spring to retract said locking pin away from the hole in said frame seat post to permit the height of the seat to be adjusted.

* * * * *